United States Patent [19]

Izumiya et al.

[11] Patent Number: 5,486,765
[45] Date of Patent: Jan. 23, 1996

[54] INSULATING CONDITION DETECTING APPARATUS FOR A WIRE-CUT ELECTRICAL DISCHARGE MACHINE

[75] Inventors: Shunzo Izumiya, Fujiyoshida; Akihiro Sakurai; Akiyoshi Kawahara, both of Minamitsuru, all of Japan

[73] Assignee: Fanuc Ltd., Yamanashi, Japan

[21] Appl. No.: 190,158

[22] PCT Filed: May 25, 1993

[86] PCT No.: PCT/JP93/00692

§ 371 Date: Feb. 4, 1994

§ 102(e) Date: Feb. 4, 1994

[87] PCT Pub. No.: WO93/24265

PCT Pub. Date: Dec. 9, 1993

[30] Foreign Application Priority Data

Jun. 4, 1992 [JP] Japan .................. 4-170125

[51] Int. Cl.⁶ .................. B23H 1/02
[52] U.S. Cl. .................. 324/537; 324/551; 219/69.13; 219/69.19
[58] Field of Search .................. 324/71.1, 511, 324/537, 551, 678, 713, 718; 219/69.12, 69.13, 69.14, 69.16, 69.18, 69.19

[56] References Cited

U.S. PATENT DOCUMENTS

| | | | |
|---|---|---|---|
| 3,969,602 | 7/1976 | Matulaitis | 219/69.13 |
| 3,997,753 | 12/1976 | Inoue | 219/69.13 |
| 4,329,558 | 5/1982 | Martin | 324/71.1 |
| 4,602,142 | 7/1986 | Itoh | 219/69.13 |
| 4,710,603 | 12/1987 | Obara | 219/69.13 |
| 4,833,289 | 5/1989 | Obara | 219/69.18 |

FOREIGN PATENT DOCUMENTS

| | | |
|---|---|---|
| 60-180718 | 9/1985 | Japan . |
| 63-318222 | 12/1988 | Japan . |
| 650433 | 7/1985 | Switzerland . |

OTHER PUBLICATIONS

Patent Abstracts of Japan, vol. 9, No. 316, 12 Dec. 1985 & JP-A-60 150 912, 8 Aug. 1985.

*Primary Examiner*—Kenneth A. Wieder
*Assistant Examiner*—Christopher M. Tobin
*Attorney, Agent, or Firm*—Staas & Halsey

[57] ABSTRACT

An insulating condition detecting apparatus for a wire-cut electrical discharge machine in which insulation between a wire electrode and a workpiece is detected without rising any other special power source than a power source for machining. A voltage between the wire electrode (6) and the workpiece (6) is detected during a period. A switching element (3) for electrical discharge, formed of a semiconductor, is turned off and a switching element for charging is turned on to charge the capacitor. When the detected voltage is lower than a reference value, it is determined that the insulation between the wire electrode and the workpiece is unsatisfactory, and a dielectric breakdown signal is outputted.

3 Claims, 2 Drawing Sheets

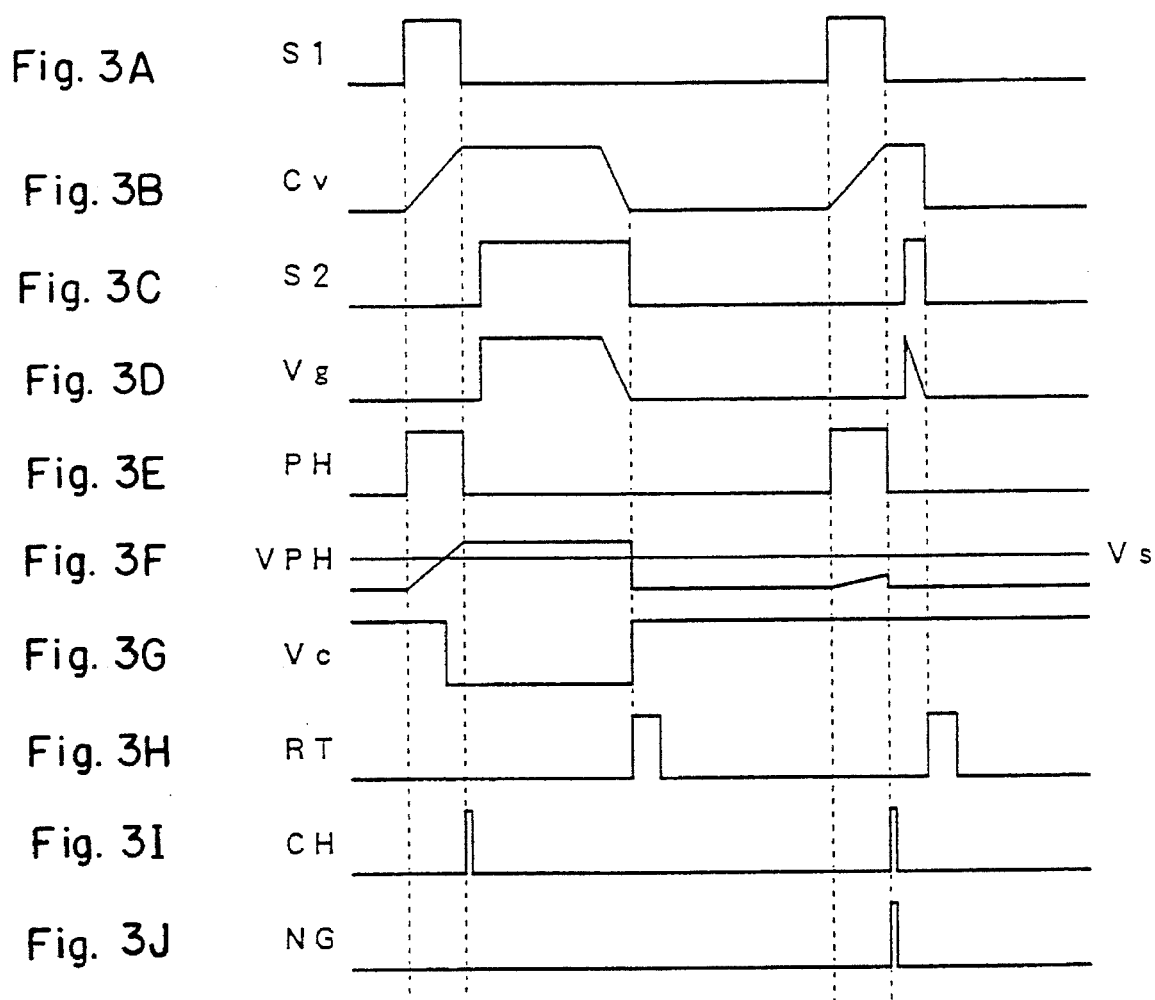

ns5,486,765

INSULATING CONDITION DETECTING APPARATUS FOR A WIRE-CUT ELECTRICAL DISCHARGE MACHINE

TECHNICAL FIELD

The present invention relates to a wire-cut electrical discharge machine, more particularly, to an insulating condition detecting apparatus for detecting the recovery of insulation between a wire electrode and a workpiece.

BACKGROUND ART

In a wire-cut electrical discharge machine, machining is effected by applying voltage between a wire electrode and a workpiece, thereby causing electrical discharge between the wire electrode and the workpiece. An insulating machining fluid is supplied between the wire electrode and the workpiece, so that insulation between the wire electrode and the workpiece is recovered with a termination of every cycle of electrical discharge. After the insulation is recovered, voltage is applied again between the wire electrode and the workpiece, thereby causing an dielectric breakdown and resulting electrical discharge. If another electrical discharge is started without recovering the insulation between the wire electrode and the workpiece after the preceding electrical discharge, the electrical discharges occur in one and the same place (concentrated electrical discharge), thereby adversely affecting the accuracy and quality of the machined surface. If such concentrated electrical discharge has occurred, the machining will have to be suspended.

Conventionally, in order to check whether or not the insulation is recovered, a voltage from another power source, separate from the power source for electrical discharge machining, is applied between the wire electrode and the work piece during the off-time in which no voltage for machining is applied between the wire electrode and the workpiece, and the voltage between them are detected.

If a special power source separate from the power source for machining is used, as in the conventional method, in order to detect the recovery of the insulation between the wire electrode and the workpiece, it needs to provide such power source and its control circuit which render the wire-cut electrical discharge machine costly.

SUMMARY OF THE INVENTION

The present invention provides an insulating condition detecting apparatus capable of detecting insulation between a wire electrode and a workpiece by utilizing a power source for electrical discharge machining without the use of any special power source for detection.

An insulating condition detecting apparatus according to the present invention comprises a capacitor for storing a charging voltage applied between a wire electrode and a workpiece, a switching element for charging the capacitor, a switching element for electrical discharge formed of a semiconductor to apply the charging voltage of the capacitor between the wire electrode and the workpiece, voltage detector, to operate for a period during which the switching element for electrical discharge is turned off and including a period during which the switching element for charging is turned on, to detect the voltage between the wire electrode and the workpiece, and discriminator for comparing the voltage detected by the voltage detector and a set reference value in order to discriminate an dielectric breakdown when the detected voltage is lower than the reference value. The voltage detector may be composed of a peak hold circuit which includes a switching unit and a capacitor.

When the discharging switching element is composed of a semiconductor, a certain voltage is produced between the wire electrode and the workpiece while the capacitor is being charged by turning on the charging switching element with the discharging switching element kept turned off. Presumably, this is attributable to the influence of a leakage current from the discharging switching element which is formed of the semiconductor. The presence of this voltage is confirmed by an experiment. According to the present invention, the voltage between the wire electrode and the workpiece is detected by the voltage detector, utilizing the aforementioned phenomenon, during the so-called off-time period through which the discharging switching element is kept turned off and the capacitor is charged with the charging switching element kept turned on. If the insulation between the wire electrode and the workpiece is recovered, the voltage detected by the voltage detector is higher than the reference value. If the insulation is not recovered, the output of the voltage detector is not higher than the reference value. Thus, the dielectric breakdown can be detected by comparing the voltage between the wire electrode and the workpiece with the reference value by a comparator.

BRIEF DESCRIPTION OF THE DRAWINGS

FIGS. 3A–3J are timing charts illustrating the operation of the insulation monitoring apparatus shown in FIGS. 1 and 2.

DESCRIPTION OF THE PREFERRED EMBODIMENTS

Figure 1:
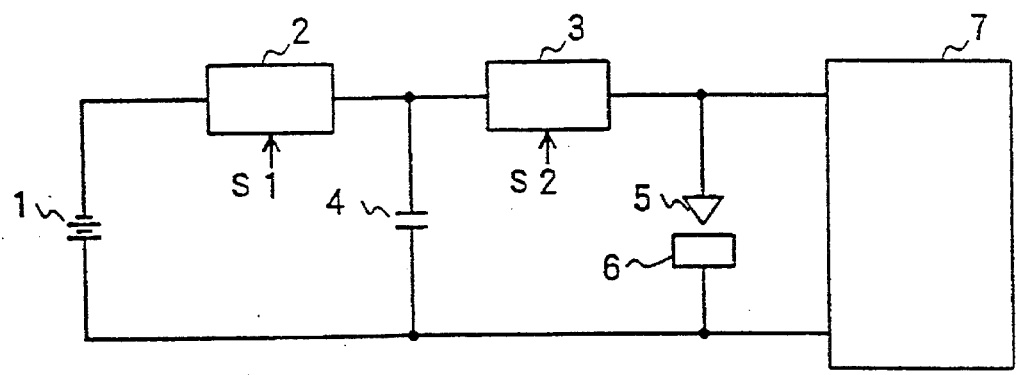
FIG. 1 is a block diagram showing the principal portions of a power source unit for electrical discharge machining and an insulation monitoring apparatus according to one embodiment of the present invention.

In FIG. 1, a capacitor 4 is connected to a DC power source 1 for machining through a switching element 2 for charging. One end of the capacitor 4 is connected to a workpiece 6, and the other end is connected to a wire electrode 5 through a switching element 3 for electrical discharge. A power circuit for electrical discharge machining of this type is conventionally known as a capacitor discharge circuit which comprises a switching element for charging and a switching element for electrical discharge. In the present invention, in particular, the switching element 3 for electrical discharge is formed of a semiconductor. An insulation monitoring apparatus 7 for detecting insulation between the wire electrode 5 and the workpiece 6 is connected to the wire electrode 5 and the portion of the workpiece 6 to undergo the electrical discharge machining.

When a charging command S1 is inputted to the switching element 2 for charging, the switching element 2 for charging is turned on, whereby the capacitor 4 is charged by the DC power source 1. After the passage of a predetermined time, the charging signal S1 is cut off to cause the switching element 2 for charging to be turned off. Thereafter, a discharge command S2 is inputted to the switching element 3 for electrical discharge with a delay of a predetermined time, so that the switching element 3 for electrical discharge is turned on, and the charging voltage of the capacitor 4 is applied between the wire electrode 5 and the workpiece 6. Thereupon, electrical discharge is caused between the wire electrode 5 and the workpiece 6. When a discharge current decreases below a predetermined level, and termination of the electrical discharge is detected, the discharge command S2 is cut off, so that the switching element 3 for electrical discharge is turned off. After this, these processes of operation are repeated to effect electrical discharge machining. This function is identical with that of the conventional power circuit for electrical discharge machining of this type.

Figure 2:
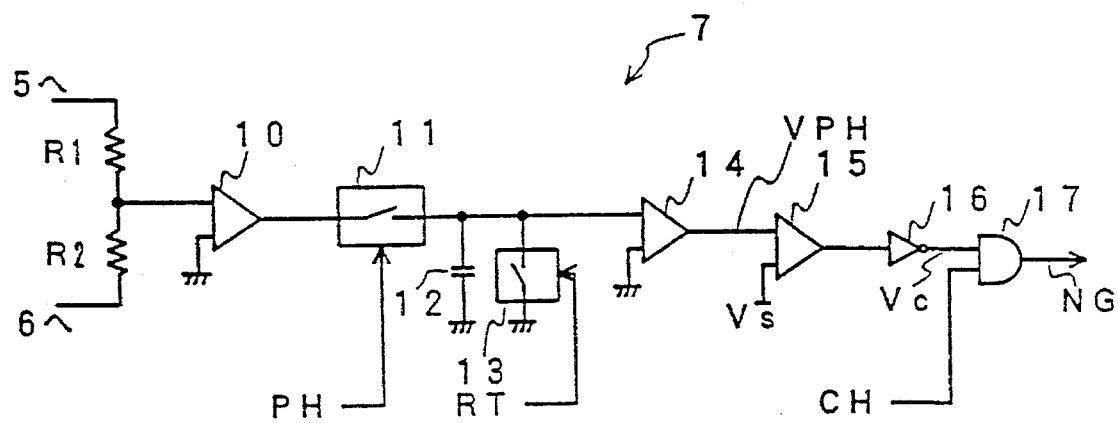
FIG. 2 is a block diagram showing a circuit configuration of the insulation monitoring apparatus shown in FIG. 1.

FIG. 2 is a block diagram showing details of the insulation monitoring apparatus 7 described above. The voltage between the wire electrode 5 and the workpiece 6 is outputted after being divided by resistors R1 and R2, and amplified by a buffer amplifier 10. An output from the buffer amplifier 10 is inputted to a peak hold circuit which is composed of a switching element 11 for peak hold and a capacitor 12. An output from the peak hold circuit is amplified by a buffer amplifier 14, and an output (peak hold voltage) VPH from the buffer amplifier 14 is applied to a comparator 15 to be compared with a set reference voltage Vs. An output from the comparator 15 is applied to an AND circuit 17 through an inverter 16. The AND circuit 17 obtains the AND of the output of the comparator 15 and a check pulse CH, and delivers a dielectric breakdown signal NG. A switch circuit 13 is turned on in response to a reset signal RT, and discharges the capacitor 12.

Referring now to the timing chart of FIG. 3, overall operation including the insulation detecting operation will be described. In FIG. 3, the left-hand side portion represents electrical discharge caused when the insulation between the wire electrode and the workpiece is satisfactory, and the right-hand side portion represents electrical discharge caused when the insulation is unsatisfactory.

When the charging signal S1 is delivered from a control device of an electrical discharge machine so that the switching element 2 for charging is turned on to start charging the capacitor 4, the charging voltage Cv of the capacitor 4 rises, as shown in FIG. 3. When the charging of the capacitor 4 is finished after the passage of a predetermined time, the charging signal S1 is cut off, and the switching element 2 for charging is turned off. Thereafter, the discharge signal S2 is outputted with the delay of the predetermined time, so that the switching element 3 for electrical discharge is turned on. Thereupon, the charging voltage Cv of the capacitor 4 is applied to the gap between the wire electrode 5 and the workpiece 6, whereby electrical discharge is generated in the gap. When termination of the electrical discharge is detected, the discharge signal S2 is cut off, and the switching element 3 for electrical discharge is turned off. After this, these processes of operation are repeated to advance the electrical discharge machining.

On the other hand, synchronously with the charging signal S1, a peak-holding signal PH with the same pulse width is delivered from the control device to the switching element 11 for peak hold of the insulation monitoring apparatus 7, thereby turning on the switching element 11.

In particular, the peak-holding signal is a signal 10 which causes the aforesaid peak-holding switching element 11 to be kept turned on for the period through which the switch element 3 for discharging is turned off and also including a period through which the switching element 2 for charging is turned on to charge the capacitor 4. When the switching element 11 for peak hold is turned on, a divided voltage of the gap voltage Vg between the wire electrode 5 and the workpiece is applied to the capacitor 1E through the buffer amplifier 10, whereby the capacitor 1E is charged.

During the period in which the peak-holding signal PH is outputted, the switching element 3 for electrical discharge is kept turned off, and thus no voltage is applied between the wire electrode 5 and the workpiece 6, so that no voltage is supposed to be produced between the wire electrode 5 and the workpiece 6. Actually, however, the result of experiment indicates that a voltage is produced between the wire electrode 5 and the workpiece 6. Presumably, this is attributable to the influence of a leakage current from the semiconductor which constitutes the switching element 3 for electrical discharge.

When the insulation between the wire electrode and the workpiece is satisfactory, the voltage between the wire electrode 5 and the workpiece 6 increases, so that the charging voltage of the capacitor 12 rises, and the peak hold voltage VPH obtained by amplifying the charging voltage of the capacitor 12 by the buffer amplifier 14 rises to exceed the reference voltage Vs set in the comparator 15. Accordingly, a signal Vc obtained by inverting the output of the comparator 15 by the inverter 16 becomes a low-level signal, as shown in the left-hand side portion of FIG. 3. Immediately after the peak-holding signal PH is cut off, the check pulse CH is outputted from the control device, and the AND of the output signal Vc from the inverter 16 and the check pulse CH is taken by the AND circuit 17. However, if the insulation between the wire electrode 5 and the workpiece 6 is satisfactory, the signal Vc is on the low level, so that the dielectric breakdown signal NG is not delivered from the AND circuit 17. When electrical discharge is caused between the wire electrode 5 and the workpiece 6, and this is followed by the fall of discharge current below the predetermined level and the detection of the termination of the electrical discharge, the reset pulse RT is delivered from the control device to turn on the switch circuit 13, thereby discharging the capacitor 12 for rendering it ready for another voltage detection.

If the insulation between the wire electrode 5 and the workpiece 6 is unsatisfactory, as shown in the right-hand side portion of FIG. 3, the voltage between the wire electrode 5 and the workpiece 6 will not increase nor will the charging voltage of the capacitor 12 of the peak hold circuit increase. Accordingly, the peak hold voltage VPH will not exceed the reference voltage Vs set in the comparator 15, so that the signal Vc delivered from the inverter 16 will remain on the high level. As a result, the dielectric breakdown signal NG is delivered from the AND circuit 17 when the check pulse CH is inputted to the AND circuit 17.

In the embodiment described above, the peak hold circuit is composed of the switching element 11 for peak hold and the capacitor 12. In this case, if the voltage delivered from the buffer amplifier 10 rises and then drops while the switching element 11 for peak hold is kept turned on, the peak voltage cannot be detected accurately, which, however, causes no adverse effect in practice. The peak voltage can be detected securely by interposing a diode in the forward direction (direction in which current flows from the buffer amplifier 10 to the capacitor 12) between the junction of the switching element 11 for peak hold and the capacitor 12.

We claim:

1. An apparatus for detecting insulation between a wire electrode and a workpiece of a wire-cut electrical discharge machine, comprising:

a capacitor storing a charged voltage to be applied between the wire electrode and the workpiece;

a charging switching element for charging said capacitor;

a discharging switching element, formed of a semiconductor, for discharging a capacitor and for applying the charged voltage of said capacitor between the wire electrode and the workpiece;

voltage detecting means for detecting a voltage between the wire electrode and the workpiece caused by a leakage current from the semiconductor of said discharging switching element during a period through which said capacitor is being charged when said discharging switching element is turned off and said charging switching element is turned on; and determining means for comparing the voltage detected by said voltage detecting means and a set reference value, and for determining a dielectric breakdown when the detected voltage is lower than said reference value.

2. An insulating condition detecting apparatus for a wire-cut electrical discharge machine according to claim 1, wherein said voltage detecting means comprises a peak hold circuit detecting a peak voltage between the wire electrode and the workpiece.

3. An insulating condition detecting apparatus for a wire-cut electrical discharge machine according to claim 2, wherein said peak hold circuit comprises switching means and a capacitor, said capacitor outputtinq a charged voltage to said determining means.

* * * * *

UNITED STATES PATENT AND TRADEMARK OFFICE
CERTIFICATE OF CORRECTION

PATENT NO. : 5,486,765
DATED : January 23, 1996
INVENTOR(S) : Shunzo ISUMIYA, et al It is certified that error appears in the above-indentified patent and that said Letters Patent is hereby corrected as shown below:

IN THE ABSTRACT

Line 3, change "rising" to --using--.

Line 5, delete "(6)".

Line 6, delete "(6)".

Line 7, delete "(3)" and change "semicondc-" to --semiconduc--.

Column 2, line 3, delete "10".

Column 3, line 56, delete "10";

line 64, change "1E" to --12--;

line 65, change "1E" to --12--.

Signed and Sealed this

Eighteenth Day of June, 1996

Attest:

BRUCE LEHMAN

Attesting Officer     Commissioner of Patents and Trademarks